July 23, 1968  M. L. CRIPE  3,393,514
BRAKE MALFUNCTION INDICATOR
Filed Sept. 26, 1966
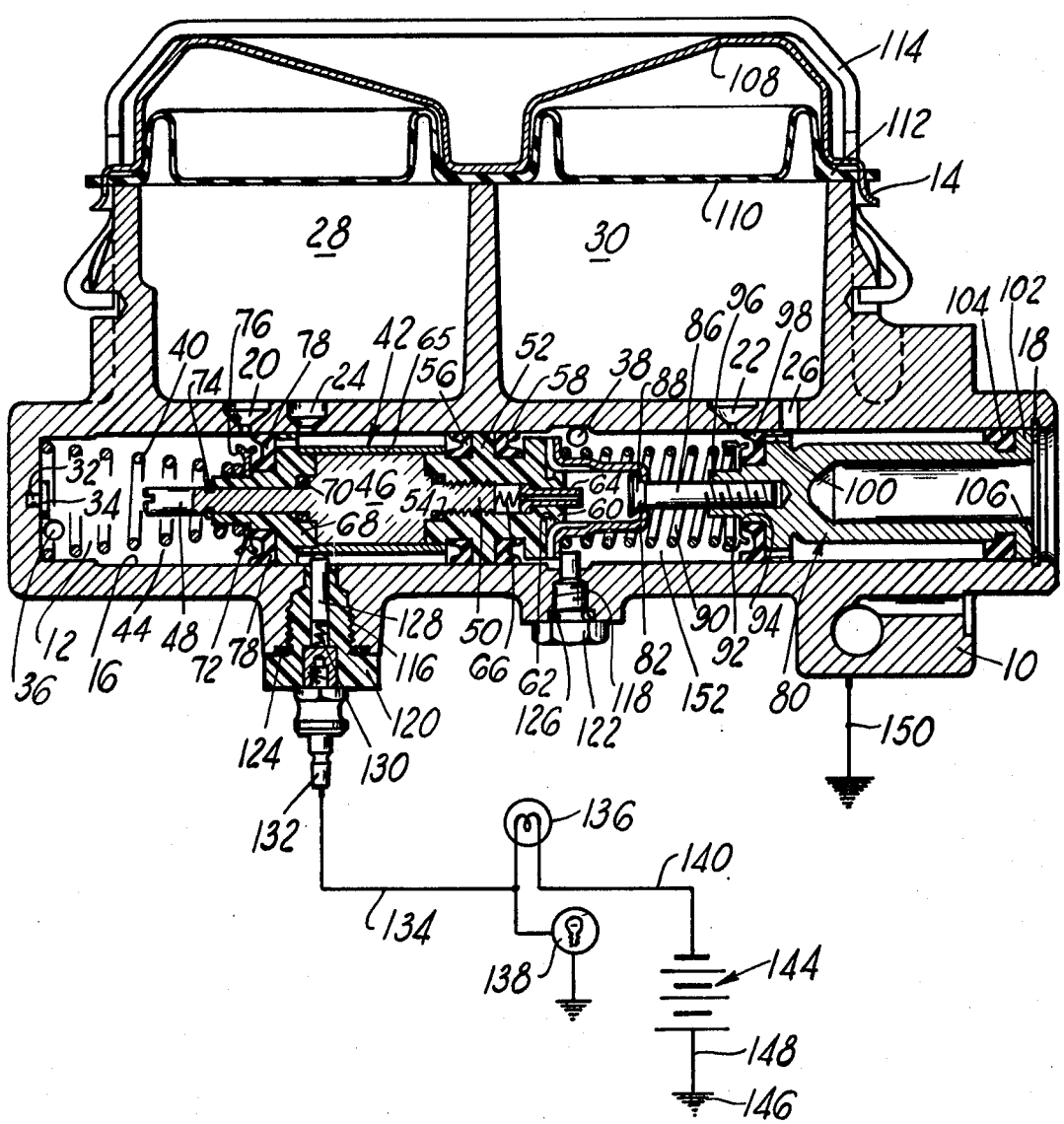
INVENTOR.
MAXWELL L. CRIPE
BY
Richard G. Geib
ATTORNEY

United States Patent Office 3,393,514
Patented July 23, 1968

3,393,514
BRAKE MALFUNCTION INDICATOR
Maxwell L. Cripe, South Bend, Ind., assignor to The Bendix Corporation, a corporation of Delaware
Filed Sept. 26, 1966, Ser. No. 581,940
18 Claims. (Cl. 60—54.6)

This invention relates to a warning device for two separate hydraulic systems as provided by split system type master cylinders.

With the advent of split system type master cylinders which provide fail-safe actuation of vehicular brakes, it has become apparent that the operator of the vehicle may not know of a malfunction within the brake system when, for example, one of the separate hydraulic systems provided by a split system master cylinder fails to develop sufficient pressure for the actuation of one portion of the brake system. It is, therefore, a principal object of this invention to provide an indicating means for a split system brake apparatus which will readily provide an operator with an indication of a malfunction.

It is another object of this invention to provide an indicator means which is integrated with the split system type master cylinder in a simple, practical and economical manner.

It is yet a more detailed object of this invention to provide an indicator of an electrical type which is sensitive to the travel of piston means within a split system type master cylinder.

It is a still further object of this invention to relate an electrical indicating system to a secondary piston within a split system type master cylinder which will complete the electrical circuitry to an indicator whenever the primary piston contacts the secondary piston and whenever the secondary piston contacts the master cylinder housing.

It is still another object of this invention to provide an indicator system of an electrical type which is sensitive to piston travel within a split system master cylinder and is provided with means to automatically test its circuit.

Other objects will appear from the following description of the drawing showing a split system type master cylinder in cross section with a travel responsive switch means connected to an electrical circuitry shown in schematic.

With more particular regard to the figure there is shown a master cylinder housing 10 which, as will be familiar to those skilled in the art to which this invention relates, is adaptable to be mounted upon a firewall for an automobile or upon a shell of a power servomotor that is in turn connected to the firewall of the automobile for operation by a brake pedal within the operator's compartment. The housing is preferably formed by casting to have an internal open ended bore 12 and a reservoir housing 14 formed therewith. After casting, the housing is then machined to have smooth sidewalls 16, a retainer groove 18, fluid return ports 20 and 22 and fluid compensating ports 24 and 26. More particularly, the ports are drilled through the walls of the bore 12 to communicate reservoir chambers 28 and 30 to the bore 12. If desired, a small hole may be drilled in the end wall of the bore 12 to receive a projection 32 of a non-corrosive type switch plate 34 in the end wall of the bore 12. In this connection, the projection 32 is sized to have an interference fit with the drilled hole in the end wall. Finally, outlet ports 36 and 38 are drilled through the housing into the bore 12. In order to prevent burrs from this drilling operation or any of the others to severely effect the operation of the master cylinder, the housing is then finally machined to provide the smooth sidewalls 16. After this the housing is ready to receive the internal parts.

By way of describing this assembly of parts, a return spring 40 is first placed against the end wall and a secondary piston, generally designated as at 42, is placed within the bore 12 against the return spring 40 to create the secondary variable volume chamber 44 between the piston 42 and the end wall of the bore.

The piston 42 is constructed from an electrically conductive center body 46 having a forward projection 48 and a rearward projection 50. An annular electrically non-conductive guide 52, such as plastic or Teflon, is screw threaded to the rearward projection with an annular seal 54 compressed therebetween. The annular guide structure 52 is provided with a pair of grooves in which annular cup seals 56 and 58 are snap fitted, and the guide 52 is provided with a rearwardly facing boss 60 having an annular recess 62. The guide 52 is also provided with a bore therethrough that is of stepped design to have threads within the larger portion of the bore and a sliding tubular member 64 in the smaller portion of the bore with a spring 66 between the threaded end of projection 50 of the center body 46 and the tubular member 64. If desired to increase the life of the center body 46 a wear surface 65 in the form of a sleeve is bonded to the center body 46. A similar wear surface may be provided by plating the center body 46 with the same result of increasing the life of the secondary piston 42. A guide 68 provided with a stepped forwardly projecting boss 72 is assembled with a seal 70 interposed to the projection 48 by a snap ring 74. A plate type spring retainer and sail positioner 76 abuts a shoulder of the stepped boss 72 and an annular lip seal 78 whose peripheral lip in the normal, released condition of the master cylinder, as shown in the drawing, will be immediately behind the return port 20 from the reservoir chamber 28 into the variable volume chamber 44. It should also be noted that the guide 68 is provided with radial flanges that have a plurality of spaced passages 78 therethrough and in the normal position will be immediately ahead of the compensating port 24 communicating the reservoir 28 to the bore 12.

Prior to the assembly of the secondary piston 42 within the bore 12, a primary piston generally indicated, as at 80, is in abutting relationship with the secondary piston 42. This is accomplished by utilizing a caged spring assembly having a cup-shaped retainer 82 with a forwardly facing flange abutting the guide 52. However, prior to the uniting of this cup-shaped retainer 82 to the guide 52 and the secondary piston 42 the adjusting member 86 in the form of a bolt having a large head 88 is placed through an opening in the cup-shaped retainer 82. Next a coil spring 90 is placed between the cup-shaped retainer 82 and a plate type spring retainer and seal positioner 92 that abuts a shoulder 94 formed on a forwardly extending boss 96 of the primary piston 80, and the bolt 86 is screwed into the primary piston 80 until the spring 90 is of a predetermined height and the cup-shaped retainer 82 is spaced a predetermined distance from the boss 96. It should be noted that even prior to this assembly a lip seal 98 is placed about the forward face of the primary piston 80 and thereafter the plate type spring retainer and seal positioner is placed against the boss 94. The primary piston 80 is provided with radial flanges having axial passages 100, and with another radial flange 102 at its trailing or aftermost end. A guide seal structure 104 is placed within a groove in the primary piston ahead of the aft flange 102 and a snap ring 106 is fitted within the groove 18 after the assembly of the primary and secondary piston construction within the bore 12.

The master cylinder construction is completed by providing a cap 108 having a pressure responsive membrane 110 whose peripheral portions 112 are compressed between the reservoir housing 14 and the cap 108 by a spring clip 114. Thus by simply snapping the spring clip 114 one can remove the cap 108 to maintain the proper fluid level within the reservoir chambers 28 and 30.

The housing 10 is provided with tapped openings 116 and 118 into the bore 12 which receive a plastic threaded switch housing 120 and a stop 122, respectively. Both the plastic switch housing 120 and the stop 122 compress annular seals 124 and 126 upon their assembly to the housing 10 to thereby maintain the fluid integrity of the bore 12. The stop 122 cooperates with the cup-shaped spring retainer 82 in limiting the released position of both the secondary piston 42 and the primary piston 80. The plastic switch housing slidably mounts a switch contact 128 that is biased inwardly into the bore 12 by a spring 130 which spring connects the contact 128 to a switch terminal 132 insulatedly carried by the switch housing 120.

An electrical lead 134 connects the switch terminal 132 with an indicator 136 and to an ignition switch 138 for the vehicle. The indicator 136 as well as the switch 138 is connected by a lead 140 to a positive side of a storage battery 144. The negative side of this storage battery is connected to a ground 146 by a lead 148. Lead 150 will insure the grounding of housing 10, but it may not be necessary, as in usual practice of mounting housing 10 to a vehicle's firewall, which is grounded, the ground connection can be obtained without lead 150.

In operation the brake pedal, not shown, is depressed by an operator within the operator's compartment to urge a push rod (not shown) to move the primary piston 80 within the bore 12 and thereby reduce the volume in the primary or first variable volume chamber 152. This movement will then compress the spring 90 to start the secondary piston 42 to reduce the volume in the secondary variable volume chamber 44. As the pressures within the variable volume chambers 152 and 44 are increased, they are delivered by outlet ports 36 and 38 to the vehicle's brake systems. In a preferred embodiment the outlet port 38 is connected to an automobile's front brakes and the outlet port 36 is connected to an automobile's rear brakes.

In the event there is a malfunction in the braking system such as a rupture of the line connected to the outlet port 38 the variable volume chamber 152 will not develop sufficient pressure to push back on the primary piston 80. Thus, the piston will move down and the adjustable member or bolt 86 will contact the tubular member 64, or switch contact as it may be termed. Because the radial flange 102 is in sliding contact with the sidewalls 16 of the bore 12, this will mean that the electrical circuitry to the indicator 136 is completed and a warning light or buzzer will immediately be actuated within the operator's compartment to indicate that he has a brake malfunction.

In the event the primary side of the master cylinder is in working condition and there has been a failure in the secondary side, as by a rupture of the line connecting outlet port 36 to the rear brakes of the automobile, the lack of pressure in the secondary volume chamber 44 will mean that the secondary piston 42 will upon initial force being applied to the primary piston 80 move down the bore 12 until the projection 48 is engaging the non-corrosive switch plate 34. At this time the electrical circuit for the indicator 136 is again completed so that the operator is warned of a malfunction.

In order to provide the operator with an indication that his brake alarm system is in working order, it is suggested that the indicator 136 be connected to the ignition switch 138 and more particularly to the start terminal therefor so that whenever the key is inserted therewithin and the switch is rotated to start the engine, the light 136 or buzzer or whatever else one may want to use as an indicator is actuated.

Having fully described a preferred arrangement for the concepts embodied by my invention, I now wish to set forth the protection sought by these Letters Patent in the following claims.

I claim:

1. For use in a master cylinder having an operator-operated piston and a floating piston operatively connected thereto to create separate pressure chambers, a means to provide a warning of excessive travel of both said operator-operated piston and said floating piston, said means comprising:
    first projection means affixed to said operator-operated piston;
    second projection means affixed to said floating piston at its forward end;
    switch contact means affixed to said floating piston on its rearward end, said switch contact means being aligned with first projection means and normally spaced therefrom;
    insulating means on said floating piston to electrically insulate said floating piston, said second projection means and said switch contact means within said master cylinder; and
    insulated switch contact means affixed to the master cylinder and operatively arranged to provide electrical contact with said floating piston.

2. A means to provide a warning of excessive travel of both said operator-operated piston and said floating piston according to claim 1 and further comprising an electrical system including:
    an electrical supply source having positive and negative poles;
    means to connect one of said poles and said master cylinder;
    indicator means connected to the other of said poles and to said insulated switch contact means; and
    a test switch means operatively interposed with said indicator and said one of said poles to provide periodic testing of said indicator.

3. The structure in accordance with claim 1 wherein said switch contact means includes a spring biased plunger.

4. The structure according to claim 1 wherein said insulating means is characterized as non-conductive bodies affixed to said floating piston at each end thereof to guide and seal the same within said master cylinder.

5. A master cylinder comprising:
    a housing having an open ended bore therein with spaced outlets;
    a movable wall closing said open ended bore and operatively arranged therewithin;
    a floating wall within said bore ahead of said movable wall, said floating wall having fore and aft insulators operatively connected to a conductive center body, which insulators carry seal means to create a first variable volume chamber between said floating wall and said movable wall and a second variable volume chamber between said floating wall and the forward end of said bore such that each of said chambers is open to one of the outlets;
    fore and aft contact means extending in respective forward and rearward directions from said conductive center body thru and beyond said fore and aft insulator means;
    an adjustable cage spring connection for said movable wall and said floating wall including an adjusting member aligned with said aft contact means and normally spaced therefrom by a spring;
    an insulated switch means affixed to said housing, said switch means having a spring biased contact projecting into said bore to be operatively connected to said conductive center body; and
    indicating means, including a power source and an indicator in series connection with said source and said switch means, said indicator being operative on engagement of said member and said aft contact means and upon engagement of said fore contact means and said housing due to connecting means between said power source and said housing with additional provisions to connect said movable wall via said housing and its connecting means to said power source.

6. A master cylinder according to claim 5 and further comprising:
   a return spring in said bore between forward end thereof and said floating wall, said return spring being operatively connected to said forward insulator; and
   a return stop connected to said housing to operatively engage said aft insulator and limit the rearward position of said floating wall in said bore as well as thru said caged spring connection limit the rearward position of said movable wall.

7. A master cylinder according to claim 5 wherein said movable wall includes radial surfaces in sliding contact with said bore to provide the additional provisions to connect said movable wall to said power source via the housing and its connecting means.

8. A master cylinder according to claim 5 wherein said floating wall is further characterized as having a center body having affixed thereto said fore and aft contact means, a first annular insulator operatively connected to said rear projection, said annular non-conductive element forming said aft insulator having a groove about its periphery to prescribe a guide which slidably engages the sidewalls of said bore, said groove receiving one portion of said seal means such that said portion also slidably and sealingly engages the sidewalls of said bore, a rearwardly projecting boss on said insulator through which said aft contact means projects, a wear portion for said center body and conductively connected thereto, a second annular non-conductive element forming said fore insulator having a forward boss for mounting another portion of said seal means and through which said forward contact means projects, a means to hold said second annular non-conductive element on said forward projection against said center body.

9. A master cylinder according to claim 6 wherein said floating wall is further characterized as having a center body having affixed thereto said fore and aft contact means, a first annular insulator operatively connected to said rear projection, said annular non-conductive element forming said aft insulator having a groove about its periphery to prescribe a guide which slidably engages the sidewalls of said bore, said groove receiving one portion of said seal means such that said portion also slidably and sealingly engages the sidewalls of said bore, a rearwardly projecting boss on said insulator through which said aft contact means projects, a wear portion for said center body and conductively connected thereto, a second annular non-conductive element forming said fore insulator having a forward boss for mounting another portion of said seal means and said return spring and through which said forward contact means projects, a means to hold said second annular non-conductive element on said forward projection against said center body.

10. A master cylinder according to claim 5 wherein the rear contact means includes a spring biased tubular member operatively arranged in the rear insulator such that pressure differentials will not be created to deter movement thereof upon engagement with said adjusting member affixed to said movable wall.

11. A master cylinder according to claim 6 wherein the rear contact means includes a spring biased tubular member operatively arranged in the rear insulator such that pressure differentials will not be created to deter movement thereof upon engagement with said adjusting member affixed to said movable wall.

12. A master cylinder according to claim 7 wherein the rear contact means includes a spring biased tubular member operatively arranged in the rear insulator such that pressure differentials will not be created to deter movement thereof upon engagement with said adjusting member affixed to said movable wall.

13. A master cylinder according to claim 8 wherein the rear contact means includes a spring biased tubular member operatively arranged in the rear insulator such that pressure differentials will not be created to deter movement thereof upon engagement with said adjusting member affixed to said movable wall.

14. A master cylinder according to claim 9 wherein the rear contact means includes a spring biased tubular member operatively arranged in the rear insulator such that pressure differentials will not be created to deter movement thereof upon engagement with said adjusting member affixed to said movable wall.

15. A master cylinder comprising:
   a housing having an open ended bore therein, a reservoir chamber and passages to communicate said reservoir chamber to said bore, said passages including return port means and compensating port means;
   a floating piston in said bore including an electrically conductive center body having axially projecting members extending toward the closed end of said bore and toward the open end of said bore, a first annular, electrically non-conductive guide sealingly affixed to one of said projecting members of said center body at one end thereof, said first guide having an annular boss with a peripheral recess, seal means about the periphery of said first guide for operative engagement, along with said guide, with sidewalls of said bore, a second annular, electrically non-conductive guide mounted over another of said projecting members and sealingly held against said center body by a snap ring in a groove on said another of said projecting members, a spring bearing and seal positioner plate operatively connected to said second annular guide with a cup seal by a return spring installed between the closed end of said bore and said plate;
   a cage spring assembly of a cup-shaped retainer having an opening therethrough and flange means, a spring, a plate type spring retainer having forward and rearward projecting lips and an adjusting member having a head of larger dimension than said opening in said cup retainer;
   an operator-operated piston slidably arranged in said bore with radial portions in electrically conductive relationship with the sidewalls thereof, said operator operated piston having means to mount a cup seal behind an abutting connection of said plate type spring retainer with further means for adjustably receiving said adjustable member to unite said floating piston to said operator-operated piston with said caged spring therebetween;
   an insulated switch removably secured to said housing having a contact within an electrically non-conductive housing extending into said bore and operatively connected to said center body of said floating piston;
   an electrical power source having an electrical lead to said contact and another electrical lead to said housing; and
   an electrically actuatable indicator means interposed in said electrical lead connecting said contact and said power source.

16. A master cylinder according to claim 15 wherein said axially projecting member extending toward the open end of said bore includes a spring biased tubular contact that is slidably carried by said first guide and aligned thereby with said adjusting member such that upon closing of said member on said contact the electrical circuit is completed for said indicator.

17. A master cylinder according to claim 15 and further comprising a non-corrosive switch plate in the end wall of said bore that is aligned with said another of said projecting members extending from said second annular guide such that upon closing of said member on said plate the electrical circuit is completed for said indicator.

18. A master cylinder according to claim 16 and further comprising a non-corrosive switch plate in the end wall of said bore that is aligned with said another of said projecting members extending from said second annular guide such that upon closing of said member on said plate the electrical circuit is completed for said indicator.

References Cited

UNITED STATES PATENTS

| | | | |
|---|---|---|---|
| 3,228,194 | 1/1966 | Blair | 60—54.5 |
| 3,358,446 | 12/1967 | Wortz | 60—54.5 |

MARTIN P. SCHWADRON, *Primary Examiner.*

ROBERT R. BUNEVICH, *Assistant Examiner.*